United States Patent
Kanazumi et al.

Patent Number: 6,154,639
Date of Patent: Nov. 28, 2000

[54] HANDSFREE UNIT

[75] Inventors: Takuya Kanazumi; Osamu Kurokawa, both of Tokyo; Akira Ishikura, Kawasaki; Yoshihiro Nomura; Masakuni Hyodo, both of Tokyo; Ken Nakamura, Yokohama, all of Japan

[73] Assignee: Kabushiki Kaisha Toshiba, Kawasaki, Japan

[21] Appl. No.: 09/199,483

[22] Filed: Nov. 25, 1998

[30] Foreign Application Priority Data

Nov. 28, 1997 [JP] Japan .................................. 9-328336

[51] Int. Cl.⁷ ...................................................... H04B 1/40
[52] U.S. Cl. ............................ 455/74; 455/431; 455/553; 379/59; 379/390; 379/3
[58] Field of Search ..................................... 455/569, 570, 455/553, 431, 74; 379/387, 388, 389, 390, 391, 59, 3

[56] References Cited

U.S. PATENT DOCUMENTS

| | | | |
|---|---|---|---|
| 5,398,281 | 3/1995 | Kurokawa | 379/390 |
| 5,404,579 | 4/1995 | Obayashi | 455/74 |
| 5,416,829 | 5/1995 | Umemoto | 379/58 |
| 5,420,911 | 5/1995 | Dahlin | 379/59 |
| 5,475,731 | 12/1995 | Rasmusson | 379/3 |
| 5,790,957 | 8/1998 | Heidari | 455/553 |
| 6,002,929 | 12/1999 | Bishop, Jr. | 455/431 |

*Primary Examiner*—Nguyen Vo
*Assistant Examiner*—John J Lee
*Attorney, Agent, or Firm*—Finnegan, Henderson, Farabow, Garrett & Dunner, L.L.P.

[57] ABSTRACT

The present invention provides a cheap handsfree unit which can prevent the howling phenomenon and reduce the input sound from the loud-speaker into the microphone in both the analog and digital modes. A reception side comprises a signal level adjusting circuit constituted by a switch circuit and attenuators, and a transmission side comprises a signal level adjusting circuit constituted by a switch circuit and attenuators, to introduce the attenuation of 15 dB or 30 dB in response to the analog or digital mode. A voice switch is constituted so that the analog reception signal and the analog transmission signal are rectified respectively by rectifiers, the levels of both signals are compared by a comparator, and either switch or switch having a higher input signal level becomes conductive as a result of the comparison. The attenuation is introduced on the basis of the communication mode, only to either the analog reception signal or analog transmission signal having a smaller signal intensity.

14 Claims, 2 Drawing Sheets

HANDSFREE UNIT

BACKGROUND OF THE INVENTION

The present invention relates to a handsfree unit corresponding to a mobile radio communication terminal of portable telephones and car mobile telephones, which can be used by selectively switching the analog mode and the digital mode, and allowing a loud communication to be made without having a communication terminal body in hand, and also relates to a dual-mode mobile radio communication apparatus using the handsfree unit.

Recently, a handsfree unit corresponding to a mobile radio communication terminal which can be used by selectively switching the analog mode and the digital mode or what is called a dual-mode apparatus, has been developed.

As is well known, a handsfree unit employs a voice switch system for introducing a constant amount of attenuation to the transmission side or reception side in response to the communication state, or uses an echo canceling circuit, in order to prevent generation of the howling phenomenon and reduce the sound which is input from a loud-speaker to a microphone.

However, if a handsfree unit employing the voice switch system is used for a dual-mode apparatus, when attenuation enough to prevent the howling phenomenon in the analog mode is set, signal processing becomes complicated in the digital mode as compared with the analog mode and the signal delay occurs and, therefore, the sound input from a loud-speaker into a microphone cannot be sufficiently reduced.

If a handsfree unit comprising an echo canceling circuit is used for the dual-mode apparatus, sufficient advantages can be obtained in both the analog mode and the digital mode, but the manufacturing cost is increased as compared with the handsfree unit employing the voice switch system.

In a small indoor room of a car mobile, the sound which is output loud from a loud-speaker is input directly to a microphone and also input after reflection on walls inside the car mobile and, therefore, the above-described problem is remarkably serious.

In a conventional handsfree unit, if the voice switch system is employed, the sound input from the loud-speaker to the microphone cannot be sufficiently reduced in the digital mode. In addition, if the echo canceling circuit is used, the manufacturing cost is remarkably increased.

BRIEF SUMMARY OF THE INVENTION

The present invention has been accomplished to solve the above problems, and its object is to provide a handsfree unit which can prevent the howling phenomenon in both the analog and digital modes and reduce the sound input from the loud-speaker to the microphone, and which can be manufactured at a small cost.

In addition, another object of the present invention is to provide a dual-mode mobile radio communication apparatus using a handsfree unit which can prevent the howling phenomenon in both the analog and digital modes and reduce the sound input from the loud-speaker to the microphone, and which can be manufactured at a small cost.

According to one aspect of the present invention, there is provided a handsfree unit used in a dual-mode radio communication apparatus for making communication with a base station by selectively employing any one of analog and digital communication modes, for allowing a loud communication to be made, the handsfree unit comprising: voice switch means for controlling signal intensity, so that signal intensity of a transmission signal is greater than signal intensity of a reception signal at the time of transmission, and signal intensity of a reception signal is greater than signal intensity of a transmission signal at the time of reception; and control amount switching means for increasing the control amount of the signal intensity controlled by the voice switch means when the communication mode of the dual-mode radio communication apparatus is the digital mode, more than the control amount of the signal intensity when the communication mode of the dual-mode radio communication apparatus is the analog mode.

In the handsfree unit having the above structure, the signal intensities are controlled by the voice switch, i.e. the signal intensity of the transmission signal is controlled to be larger than that of the reception signal at the time of transmission and the signal intensity of the reception signal is controlled to be larger than that of the transmission signal at the time of reception. If the communication mode of the dual-mode radio communication apparatus is the digital mode, the amount of the signal intensity controlled by the voice switch means is set to be larger as compared with the amount controlled in the analog mode.

Therefore, according to the handsfree unit having the above-described structure, in the digital mode in which the sound input from the loud-speaker to the microphone becomes a serious problem as well as the howling phenomenon, the signal intensity is controlled at a control amount larger than that in the analog mode, and as a result, the howling phenomenon can be prevented in both the analog mode and the digital mode and the sound input from the loud-speaker to the microphone can be reduced. In addition, the above handsfree unit can be manufactured at a smaller cost than a handsfree unit employing an echo canceling circuit.

According to another aspect of the present invention, there is provided a dual-mode radio communication apparatus for making communication with a base station by selectively employing any one of analog and digital communication modes, the dual-mode radio communication apparatus comprising: discrimination means for discriminating the analog mode and the digital mode; and a handsfree unit for allowing a loud communication to be made, the handsfree unit including voice switch means for controlling signal intensity, so that signal intensity of a transmission signal is greater than signal intensity of a reception signal at the time of transmission, and signal intensity of a reception signal is greater than signal intensity of a transmission signal at the time of reception; and control amount switching means for increasing the amount of the signal intensity controlled by the voice switch means when the communication mode of the dual-mode radio communication apparatus is the digital mode, more than the amount of the signal intensity when the communication mode of the dual-mode radio communication apparatus is the analog mode.

According to another aspect of the present invention, there is provided a hands-free unit used in a radio communication apparatus for use in a radio system, the apparatus communicating with a base station of the system using one of an analog and a digital communication modes, the hands-free unit comprising: first control means for controlling a transmit magnitude of a transmit signal from a microphone and a receive magnitude of a receive signal to a speaker so as to cause the transmit magnitude being much greater than the receive magnitude when the transmit magnitude is greater than the receive magnitude and so as to cause the receive magnitude being much greater than the transmit magnitude when the receive magnitude is greater than the transmit magnitude and second control means for causing the controlling quantity of the transmit and receive magnitudes in the digital mode being greater than those in the analog mode.

According to another aspect of the present invention, there is provided a radio communication apparatus for use in a radio system, the apparatus communicating with a base station of the system using one of an analog and a digital communication modes, the apparatus comprising: determining means for determining which one of the modes the apparatus selects; first control means for controlling a transmit magnitude of a transmit signal from a microphone and a receive magnitude of a receive signal to a speaker so as to cause the transmit magnitude being much greater than the receive magnitude when the transmit magnitude is greater than the receive magnitude and so as to cause the receive magnitude being much greater than the transmit magnitude when the receive magnitude is greater than the transmit magnitude; and second control means responsive to the determining means for causing the controlling quantity of the transmit and receive magnitudes in the digital mode being greater than those in the analog mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
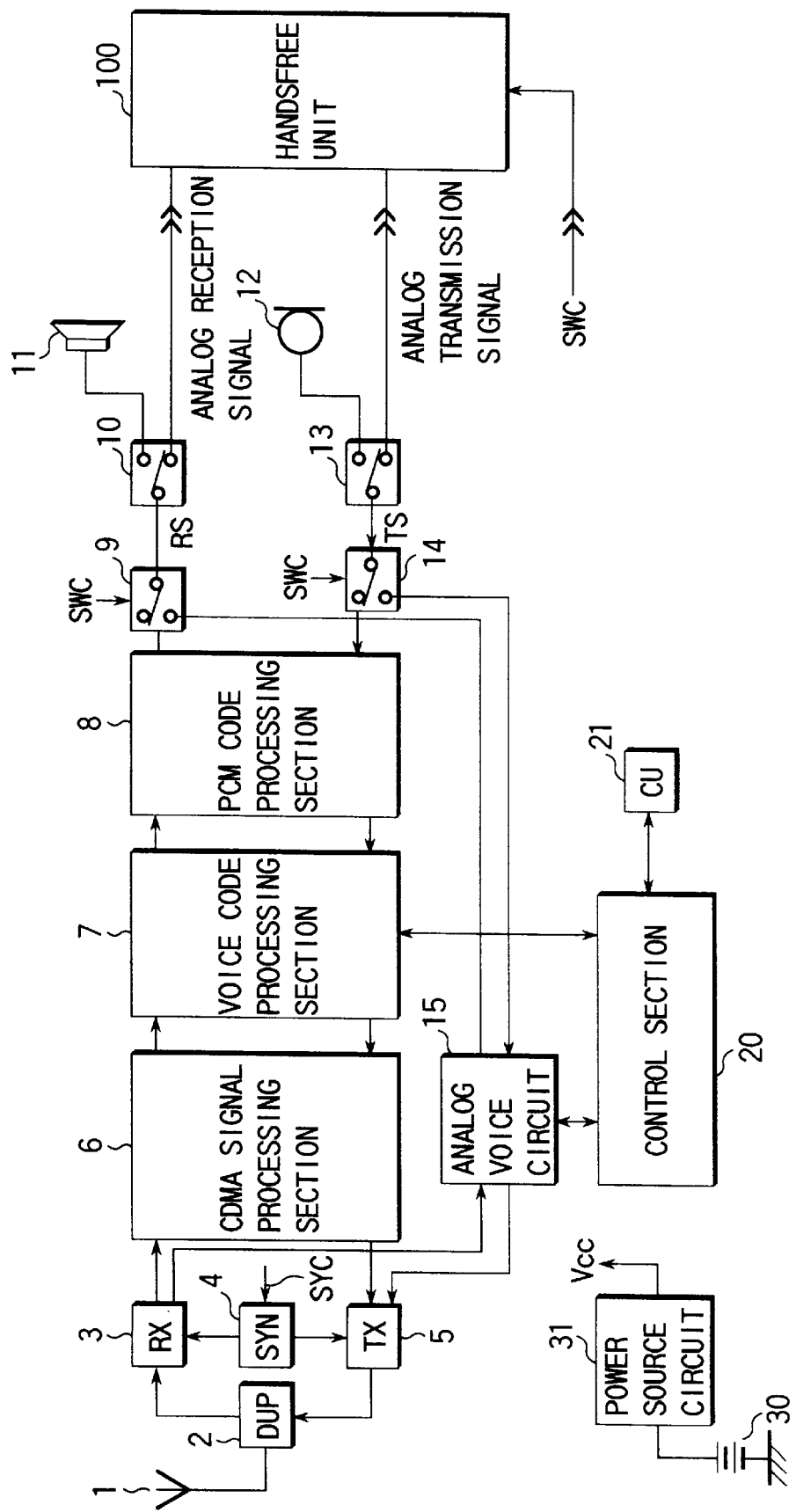
FIG. 1 is a circuit block diagram illustrating a configuration of a dual-mode type mobile communication terminal connected to a handsfree unit according to the present invention.

An embodiment of the present invention will be described with reference to the drawing.

FIG. 1 is a circuit block diagram illustrating a mobile communication terminal such as a portable cellular telephone and a car mobile telephone connected to a handsfree unit 100 according to the present invention. The mobile communication terminal shown in this figure is a dual mode apparatus corresponding to two communication modes of, the analog mode and the CDMA (Code Division Multiple Access) type digital mode.

In a state where the digital mode is set and the handsfree unit 100 is not electrically connected, switch circuits 9 and 14 of the dual mode apparatus illustrated in FIG. 1 are switched to the side of a PCM code processing section 8 on the basis of a switch control signal SWC that is output from a control circuit 20, and switch circuits 10 and 13 are switched respectively to the sides of a loud-speaker 11 and a microphone 12.

In this state, a radio frequency signal transmitted from a base station (not shown) via a digital communication channel is received by an antenna 1 and then input to a receiving circuit (RX) 3 via an antenna duplexer (DUP) 2.

In the receiving circuit 3, the received radio frequency signal is mixed with a reception local-oscillation signal that is output from a frequency synthesizer (SYN) 4 and then frequency-converted to an intermediate frequency signal. The frequency of the reception local-oscillation signal generated from the frequency synthesizer 4 is instructed on the basis of a control signal SYC that is output from the control circuit 20.

The reception intermediate frequency signal is subjected to the orthogonal demodulation in a CDMA signal processing section 6 and then subjected to the despreading, and reception data for its own apparatus is extracted from the signal. The extracted reception data is subjected to the expansion in a voice code processing section 7 so as to be converted to a digital reception signal.

The digital reception signal is decoded in the PCM code processing section 8, to an analog reception signal, which is output to the loud-speaker 11 via the switch circuits 9 and 10. The analog reception signal is amplified by an amplifier (not shown) and output from the loud-speaker 11.

On the other hand, a transmission signal of a speaker which is input to the microphone 12 is amplified by an amplifier (not shown), and is output to the PCM code processing section 8 via the switch circuits 13 and 14.

The analog transmission signal which is input to the PCM code processing section 8 is subjected to the PCM encoding so as to be converted to a digital transmission signal, which is subjected to the compression in the voice code processing section 7 and is input to the CDMA signal processing section 6 as transmission data.

The transmission data is subjected to the spreading on the basis of a PN code corresponding to the transmission channel and then subjected to the orthogonal modulation, and is input to a transmitting circuit (TX) 5.

In the transmitting circuit 5, the orthogonal modulation signal is mixed with a transmission local-oscillation signal and converted to a radio frequency signal, which is amplified to a high frequency signal.

The transmission local-oscillation signal is output from the frequency synthesizer 4 on the basis of an instruction of the control circuit 20.

The transmission radio frequency signal that is output from the transmitting circuit 5 is supplied to the antenna 1 via the antenna duplexer 2, and then transmitted from the antenna 1 to a base station (not shown).

Next, in a state in which the analog mode is set and the handsfree unit 100 is not connected, the switch circuits 9 and 14 are switched to the side of an analog voice circuit 15 on the basis of a switch control signal SWC which is output from the control circuit 20, and the switch circuits 10 and 13 are switched respectively to the sides of the loud-speaker 11 and the microphone 12.

In this state, the radio frequency signal transmitted from a base station (not shown) via an analog communication channel is received by the antenna 1, input to the receiving circuit 3 via the antenna duplexer 2 and frequency-converted to an intermediate frequency signal in the receiving circuit 3. The reception intermediate frequency signal, which is output from the receiving circuit 3, is input to the analog voice circuit 15.

In this analog voice circuit 15, the reception intermediate frequency signal is reproduced as an analog reception signal by the FM demodulation. The analog reception signal is amplified by an amplifier (not shown) via the switch circuits 9 and 10 and then output from the loud-speaker 11.

On the other hand, the transmission signal of the speaker which is output from the microphone 12 is amplified by an amplifier (not shown) and then input to the analog voice circuit 15 via the switch circuits 13 and 14.

In the analog voice circuit 15, a signal which is FM-modulated on the basis of the transmission signal is generated and input to the transmitting circuit 5. In the transmitting circuit 5, the modulated signal is mixed with the transmission local-oscillation signal which is generated from the frequency synthesizer 4 on the basis of the radio frequency of the analog communication channel, and up-converted to a radio frequency signal, and amplified in the high frequency to the predetermined output level.

The radio frequency signal which is output from the transmitting circuit 5 is supplied to the antenna 1 via the antenna duplexer 2 and transmitted from the antenna 1 to a base station (not shown).

The control circuit 20 has, for example, micro-computers as its main control section to integrate and control each section for the control of the radio connection or communication.

A console unit (CU) 21 comprises a key group of a dial key, a call key, an end key, a volume adjustment key and a mode designation key, and an LCD indicator for indicating a telephone number of a destination terminal and the operated state of apparatus.

Reference numeral 31 denotes a power source circuit, which generates a predetermined operational power source voltage Vcc on the basis of the output of a battery 30 and supplies it to each circuit.

The handsfree unit 100 is connected to the above-described mobile communication terminal by the connector, etc. so as to loud-output the received voice or receive the voice of the speaker to be transmitted, instead of the loud-speaker 11 and the microphone 12, so that the speaker can make communication without having the mobile communication terminal in his hand.

Figure 2:
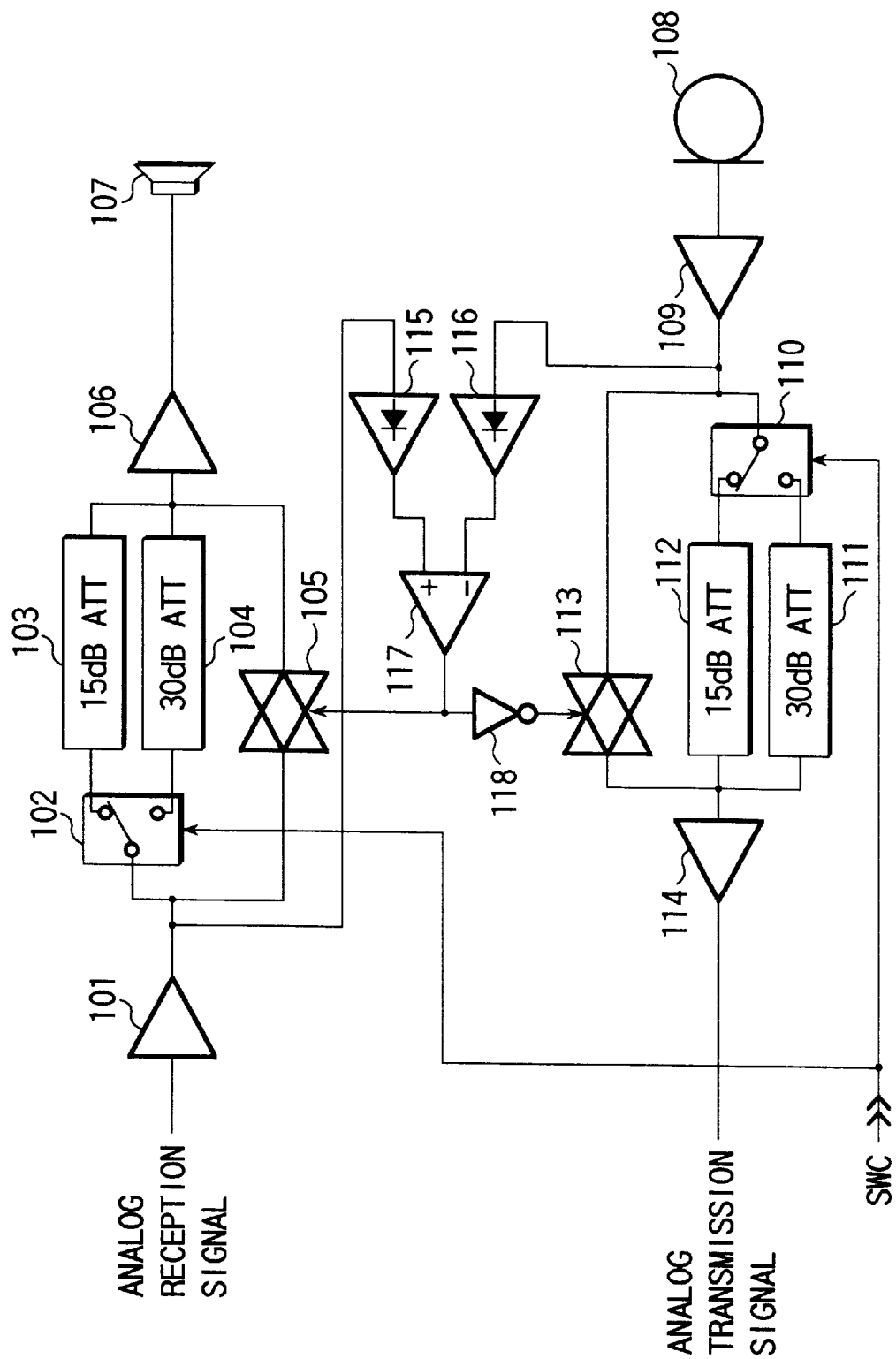
FIG. 2 is a circuit block diagram illustrating a configuration of an embodiment of the handsfree unit according to the present invention.

The handsfree unit 100 will be described below with reference to FIG. 2. FIG. 2 is a circuit block diagram illustrating a configuration of the handsfree unit 100.

The analog reception signal which is input via the switch circuit 10 shown in FIG. 1 is amplified at a predetermined gain in an amplifier 101, and is input to a switch circuit 102, a switch 105 and a rectifier 115.

The switch circuit 102 outputs the analog reception signal to an attenuator (15 dB ATT) 103 or an attenuator (30 dB ATT) 104, selectively, on the basis of a switch control signal SWC which is input by the connection to the above-described mobile communication terminal. The analog reception signal is output to attenuator 103 in the analog mode, and to the attenuator 104 in the digital mode.

The attenuators 103 and 104 attenuate the input signal at 15 dB and 30 dB, respectively. The attenuation of the attenuator 104 used in the digital mode is set to be larger than that of the attenuator 103. The analog reception signal from the attenuator 103 or 104 is input to an amplifier 106.

The switch 105 is controlled to be turn ON/OFF in response to the output of a comparator 117 described later. If an Hi signal is input, the switch 105 becomes conductive so that the analog reception signal from the amplifier 101 bypasses the attenuator 103 or 104 and is input to the amplifier 106.

The analog reception signal which is output through the attenuators 103 or 104, or the switch 105, is amplified at a predetermined gain at the amplifier 106 and is output from a loud-speaker 107.

On the other hand, the speaker's transmission signal that is input to a microphone 108, is amplified at a predetermined gain at an amplifier 109, and is input to a switch circuit 110, a switch 113 and a rectifier 116.

The switch circuit 110 outputs the analog transmission signal to an attenuator (30 dB ATT) 111 or an attenuator (15 dB ATT) 112, selectively, on the basis of the switch control signal SWC from the above-described mobile communication terminal. Similarly to the above-described switch circuit 102, the analog transmission signal is output to the attenuator 112 in the analog mode, and to the attenuator 111 in the digital mode.

The attenuators 111 and 112 attenuate the input signal at 30 dB and 15 dB, respectively. The attenuation of the attenuator 111 used in the digital mode is set to be larger than that of the attenuator 112. The analog transmission signal that is output through the attenuator 111 or 112 is input to an amplifier 114.

The output of a comparator 117 described later is inverted and input to the switch 113 via an inverter 118, and the switch 113 is controlled to be turned ON/OFF in response to the input signal. Similarly to the above-described switch 105, when the Hi signal is input, the switch 113 becomes conductive so that the analog transmission signal from the amplifier 109 bypasses the attenuator 111 or 112 and is input to the amplifier 114.

The analog transmission signal supplied via the attenuator 111 or 112, or the switch 113 is amplified at a predetermined gain in the amplifier 114 and is output to the switch circuit 13 shown in FIG. 1.

The rectifier 115 rectifies the output of the amplifier 101 and outputs it to a "+" input terminal of the comparator 117. The rectifier 116 rectifies the output of the amplifier 109 and outputs it to a "−" input terminal of the comparator 117.

The comparator 117 compares the level of the signal which is input to the "1+" input terminal with that of the signal which is input to the "−" input terminal. If the signal which is input to the "+" input terminal is larger, the Hi signal is output. If the signal which is input to the "−" input terminal is larger, an Lo signal is output. These signals are output to the switch 105 and the inverter 118.

Next, the operations of the handsfree unit having the above-described structure will be described.

First, a case wherein the analog mode is set in the mobile communication terminal and the handsfree unit is used will be described. In this case, the switch circuits 102 and 110 are switched respectively to the 15 dB attenuators 103 and 112.

In this state, the analog reception signal is amplified by the amplifier 101, rectified by the rectifier 115 and output to the comparator 117. The analog transmission signal which is input from the microphone 108 is amplified by the amplifier 109, rectified by the rectifier 116 and output to the comparator 117.

If the level of the analog reception signal is larger than that of the voice signal from the microphone 108 (amplifier 109), such as the case where the speaker listens to the other party, the Hi signal is output from the comparator 117 so that the switch 105 becomes conductive and the switch 113 becomes opened.

By this operation, the analog reception signal amplified by the amplifier 101 is amplified by the amplifier 106 and output from the loud-speaker 107 without introducing the attenuation. On the other hand, the voice signal which is input from the microphone 108 and amplified by the amplifier 109 is amplified by the amplifier 114 and input to the mobile communication terminal after introducing the attenuation of 15 dB at the attenuator 112.

On the other hand, if the level of the voice signal from the microphone 108 (amplifier 109) is larger than that of the analog reception signal, such as the case where the speaker speaks, the Lo signal is output from the comparator 117 so that the switch 105 becomes opened and the switch 113 becomes conductive.

By this operation, the analog reception signal amplified by the amplifier 101 is amplified by the amplifier 106 and output from the loud-speaker 107 after introducing the attenuation of 15 dB at the attenuator 103. In addition, the voice signal which is input from the microphone 108 and amplified by the amplifier 109 is amplified by the amplifier 114 and input to the mobile communication terminal without introducing the attenuation.

Next, a case wherein the digital mode is set in the mobile communication terminal and the handsfree unit is used will be described. In this case, the switch circuits 102 and 110 are switched respectively to the 30 dB attenuators 104 and 111.

In this state, the analog reception signal is amplified by the amplifier 101, rectified by the rectifier 115 and output to the comparator 117. The analog transmission signal which is input from the microphone 108 is amplified by the amplifier 109, rectified by the rectifier 116 and output to the comparator 117.

If the level of the analog reception signal is larger than that of the voice signal from the microphone 108 (amplifier 109), such as the case where the speaker listens to the other party, the Hi signal is output from the comparator 117 so that the switch 105 becomes conductive and the switch 113 becomes opened.

By this operation, the analog reception signal amplified by the amplifier 101 is amplified by the amplifier 106 and output from the loud-speaker 107 without introducing the attenuation. On the other hand, the voice signal which is input from the microphone 108 and amplified by the amplifier 109 is amplified by the amplifier 114 and input to the mobile communication terminal after introducing the attenuation of 30 dB at the attenuator 111.

On the other hand, if the level of the voice signal from the microphone 108 (amplifier 109) is larger than that of the analog reception signal, such as the case where the speaker speaks, the Lo signal is output from the comparator 117 so that the switch 105 becomes opened and the switch 113 becomes conductive.

By this operation, the analog reception signal amplified by the amplifier 101 is amplified by the amplifier 106 and output from the loud-speaker 107 after introducing the attenuation of 30 dB at the attenuator 104. In addition, the voice signal which is input from the microphone 108 and amplified by the amplifier 109 is amplified by the amplifier 114 and input to the mobile communication terminal without introducing the attenuation.

Thus, the handsfree unit having the above-described structure employs the voice switch system that introduces the attenuation (loss) to either the transmission signal or reception signal having a lower signal intensity, so as to introduce a different attenuation to the transmission signal (or reception signal) in response to the analog mode or digital mode. That is, in the digital mode in which the input sound from the loud-speaker into the microphone is regarded as a problem as well as the howling phenomenon, the attenuation is increased more than that in the analog mode.

As a result, according to the handsfree unit having the above structure, in both the analog and digital modes the howling phenomenon can be prevented and the input sound from the loud-speaker into the microphone can be reduced. In addition, the above handsfree unit is cheaper than a handsfree unit employing an echo canceling circuit.

Further, in the conventional handsfree unit, if large attenuation is set to reduce the input sound from the loud-speaker into the microphone in the digital mode, the duplex characteristic is lost in the analog mode which does not require the large attenuation. In the handsfree unit having the above structure, however, the attenuation is set in response to the communication mode and, therefore, the duplex characteristic in the analog mode cannot be lost.

The present invention is not limited to the above embodiment. For example, in the above embodiment, a different attenuation (loss) is introduced to the communication signal in response to the analog mode or digital mode. The same advantage, however, can be obtained even if the amplification (degree) is set to be varied by using an amplifier instead of varying the attenuation by using an attenuator.

Needless to say, the present invention can be variously modified within an inventive scope that does not exceed the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A handsfree unit used in a dual-mode radio communication apparatus for making communication with a base station by selectively employing any one of analog and digital communication modes, for allowing a loud communication to be made, said handsfree unit comprising:
voice switch means for controlling signal intensity, so that signal intensity of a transmission signal is greater than signal intensity of a reception signal at the time of transmission, and signal intensity of a reception signal is greater than signal intensity of a transmission signal at the time of reception; and
control amount switching means for increasing the control amount of the signal intensity controlled by said voice switch means when the communication mode of said dual-mode radio communication apparatus is the digital mode, more than the control amount of the signal intensity when the communication mode of said dual-mode radio communication apparatus is the analog mode.

2. The handsfree unit according to claim 1, wherein said voice switch means controls the signal intensity by introducing an attenuation to the reception signal at the time of transmission and to the transmission signal at the time of reception, and said control amount switching means increases the attenuation introduced by said voice switch means in the digital mode, as compared with the attenuation in the analog mode.

3. The handsfree unit according to claim 1, wherein said voice switch means controls the signal intensity by amplifying the transmission signal at the time of transmission and amplifying the reception signal at the time of reception, and said control amount switching means reduces an amplification gain of said voice switch means signal in the digital mode, as compared with the amplification gain in the analog mode.

4. A dual-mode radio communication apparatus for making communication with a base station by selectively employing any one of analog and digital communication modes, said dual-mode radio communication apparatus comprising:

discrimination means for discriminating the analog mode and the digital mode; and a handsfree unit for allowing a loud communication to be made, said handsfree unit including:

voice switch means for controlling signal intensity, so that signal intensity of a transmission signal is greater than signal intensity of a reception signal at a time of transmission, and signal intensity of a reception signal is greater than signal intensity of a transmission signal at the time of reception; and control amount switching means for increasing the control amount of the signal intensity controlled by said voice switch means when the communication mode of said dual-mode radio communication apparatus is the digital mode, more than the control amount of the signal intensity when the communication mode of said dual-mode radio communication apparatus is the analog mode.

5. The dual-mode radio communication apparatus according to claim 4, wherein said voice switch means controls the signal intensity by introducing an attenuation to the reception signal at the time of transmission and to the transmission signal at the time of reception, and said control amount switching means increases the attenuation introduced by said voice switch means in the digital mode, as compared with the attenuation in the analog mode.

6. The dual-mode radio communication apparatus according to claim 4, wherein said voice switch means controls the signal intensity by amplifying the transmission signal at the time of transmission and amplifying the reception signal at the time of reception, and said control amount switching means reduces an amplification gain of said voice switch means signal in the digital mode, as compared with the amplification gain in the analog mode.

7. A hands-free unit used in a radio communication apparatus for use in a radio system, the apparatus communicating with a base station of the system using one of an analog and a digital communication modes, the hands-free unit comprising:

first control means for controlling a transmit magnitude of a transmit signal from a microphone and a receive magnitude of a receive signal to a speaker so as to cause the transmit magnitude being much greater than the receive magnitude when the transmit magnitude is greater than the receive magnitude and so as to cause the receive magnitude being much greater than the transmit magnitude when the receive magnitude is greater than the transmit magnitude and second control means for causing the controlling quantity of the transmit and receive magnitudes in the digital mode being greater than those in the analog mode.

8. The hands-free unit according to claim 7, wherein the first control means attenuates only the receive magnitude when the transmit magnitude is greater than the receive magnitude and attenuates only the transmit magnitude when the receive magnitude is greater than the transmit magnitude and the second control means for causing the attenuating quantity of the transmit and receive magnitudes in the digital mode being greater than those in the analog mode.

9. The hands-free unit according to claim 7, wherein the first control means amplifies only the transmit magnitude when the transmit magnitude is greater than the receive magnitude and amplifies only the receive magnitude when the receive magnitude is greater than the transmit magnitude and the second control means for causing the amplifying quantity of the transmit and receive magnitudes in the digital mode being greater than those in the analog mode.

10. A radio communication apparatus for use in a radio system, the apparatus communicating with a base station of the system using one of an analog and a digital communication modes, the apparatus comprising:

determining means for determining which one of the modes the apparatus selects;

first control means for controlling a transmit magnitude of a transmit signal from a microphone and a receive magnitude of a receive signal to a speaker so as to cause the transmit magnitude being much greater than the receive magnitude when the transmit magnitude is greater than the receive magnitude and so as to cause the receive magnitude being much greater than the transmit magnitude when the receive magnitude is greater than the transmit magnitude; and second control means responsive to the determining means for causing the controlling quantity of the transmit and receive magnitudes in the digital mode being greater than those in the analog mode.

11. The apparatus according to claim 10, wherein the first control means attenuates only the receive magnitude when the transmit magnitude is greater than the receive magnitude and attenuates only the transmit magnitude when the receive magnitude is greater than the transmit magnitude and the second control means responsive to the determining means for causing the attenuating quantity of the transmit and receive magnitudes in the digital mode being greater than those in the analog mode.

12. The apparatus according to claim 10, wherein the first control means amplifies only the transmit magnitude when the transmit magnitude is greater than the receive magnitude and amplifies only the receive magnitude when the receive magnitude is greater than the transmit magnitude and the second control means responsive to the determining means for causing the amplifying quantity of the transmit and receive magnitudes in the digital mode being greater than those in the analog mode.

13. The apparatus according to claim 10, wherein the apparatus includes a portable unit and the portable unit includes the determining means.

14. The apparatus according to claim 10, wherein the apparatus includes a hands-free unit and the handsfree unit includes the first and second control means.

* * * * *